(12) United States Patent
Scherer et al.

(10) Patent No.: US 9,285,052 B2
(45) Date of Patent: Mar. 15, 2016

(54) VALVE WITH CONNECTION ON THE PRESSURE SIDE

(75) Inventors: Georg Scherer, Kirchheim (DE); Helmut Mang, Memmingen (DE); Florian Schreiber, Kadeltshofen (DE)

(73) Assignee: Firma SVM Schultz Verwaltungs-GmbH & Co. KG, Memmingen (DE)

(*) Notice: Subject to any disclaimer, the term of this patent is extended or adjusted under 35 U.S.C. 154(b) by 372 days.

(21) Appl. No.: 13/477,416

(22) Filed: May 22, 2012

(65) Prior Publication Data

US 2012/0298903 A1 Nov. 29, 2012

(30) Foreign Application Priority Data

May 27, 2011 (DE) .......................... 10 2011 103 313
Dec. 23, 2011 (DE) .......................... 10 2011 056 966

(51) Int. Cl.
| | |
|---|---|
| *F16K 31/06* | (2006.01) |
| *F16K 1/14* | (2006.01) |
| *F16K 1/42* | (2006.01) |
| *F16K 47/00* | (2006.01) |

(52) U.S. Cl.
CPC .............. *F16K 31/0637* (2013.01); *F16K 1/14* (2013.01); *F16K 1/42* (2013.01); *F16K 47/00* (2013.01)

(58) Field of Classification Search
CPC ............ F16K 31/0631; F16K 31/0637; F16K 31/0662; F16K 47/12
USPC ............. 137/596.17, 601.01, 601.14, 601.18, 137/625.26, 625.28, 625.65, 808, 809, 811, 137/813, 862, 864; 251/118, 119, 126, 251/129.14, 129.15
See application file for complete search history.

(56) References Cited

U.S. PATENT DOCUMENTS

| | | | |
|---|---|---|---|
| 2,840,102 A | | 6/1958 | Richter |
| 4,000,852 A | * | 1/1977 | Martin ....................... 239/102.2 |
| 4,936,342 A | * | 6/1990 | Kojima et al. ................ 137/510 |
| 5,076,323 A | * | 12/1991 | Schudt ..................... 137/596.17 |
| 7,165,574 B2 | * | 1/2007 | Ryuen et al. ............. 137/596.17 |
| 7,516,756 B2 | * | 4/2009 | Mayr et al. ............... 137/596.17 |
| 8,127,791 B2 | * | 3/2012 | Najmolhoda et al. ... 137/596.17 |
| 8,230,881 B2 | * | 7/2012 | Scherer et al. ........... 137/596.17 |
| 8,371,331 B2 | * | 2/2013 | Najmolhoda et al. ... 137/596.17 |
| 2005/0067028 A1 | * | 3/2005 | Ryuen et al. ............. 137/596.17 |
| 2007/0138422 A1 | * | 6/2007 | Najmolhoda et al. ... 251/129.14 |
| 2010/0276022 A1 | * | 11/2010 | Moosmann et al. .......... 137/613 |
| 2013/0133767 A1 | * | 5/2013 | Mayr et al. ............... 137/596.17 |

FOREIGN PATENT DOCUMENTS

| | | |
|---|---|---|
| DE | 202008014524 U1 | 1/2009 |
| GB | 242137 | 11/1925 |

* cited by examiner

*Primary Examiner* — Matthew W Jellett
(74) *Attorney, Agent, or Firm* — Loginov & Associates, PLLC; William A. Loginov (57) ABSTRACT

The invention refers to a valve, in particular a pressure valve, comprising a feed area provided in front of a globe valve in flow direction of the medium, wherein the globe valve can be sealed by a loose closing element provided in the feed area, and wherein an activation rod angles the closing element against the flow direction of the medium with reference to the globe valve. The invention is characterized in that in the feed area a flow guiding device is provided, wherein the flow guiding device has several channel areas, so that the medium flowing through the channel areas is set in a helical twist.

20 Claims, 7 Drawing Sheets

Fig. 5  Section A-A

Fig. 6  Section B-B

Section C - C

Fig. 7

VALVE WITH CONNECTION ON THE PRESSURE SIDE

BACKGROUND OF THE INVENTION

The invention refers to a valve, comprising a feed area provided in flow direction of the medium in front of a globe valve, wherein the globe valve can be closed by a loose closing element provided in the feed area, wherein an activating rod movable by a rod drive angles the closing element against the flow direction of the medium with reference to the valve seat of the globe valve. Valves of this type are employed in particular as pressure control valves, for example in the hydraulic circuit of an automatic transmission. In the valve an activation rod moveable by a rod drive is provided acting on the loose closing element. For example, a solenoid is employed as rod drive. The solenoid or the rod drive, for example, is activated for operating the closing element for releasing the flow of the medium through the globe valve. Usually, in the switched off or decreased state of the rod drive or the solenoid, respectively, the closing element is pressed on the valve seat of the globe valve by the flow pressure of the medium, and thus seals the globe valve. Usually, a globe valve is characterized by a valve seat delimiting or forming for example, a through bore hole or gate, and the closing element seats on the valve seat. Generally these valves are often configured (without restricting the following invention thereto) such that in a first step the loose closing element is provided, and, in a second step, located in flow direction behind it, an additional closing cone is provided that is able, for example, to close and open a reflux space with linked reflux.

With valves of this kind it has been noticed that the medium flow flowing in flow direction first has to circulate around the closing element arranged in front of the valve seat of the globe valve, in order to then flow through the rather narrow through opening between the valve seat and closing element closeable by the closing element. It has been noticed that the laminar flow actually preferred breaks down in the valve and is replaced by a turbulent flow. This turbulent flow, however, increases the flow resistance, resulting in larger dimensioned pumps for the medium flow to ensure the same valve throughput. At the same time, this is only possible with higher energy input, which is a disadvantage in particular in energy-critical applications.

BRIEF SUMMARY OF THE INVENTION

Referring to this state of the art, it is one task of the present invention to develop a valve as described above further to have an optimized flow behavior.

Referring to the above described state of the art the invention proposes a valve, in particular a pressure control valve consisting of a feed area provided in flow direction of the medium in front of a globe valve, wherein the globe valve is closeable by a loose closing element provided in the feed area, wherein an activation rod movable by a rod drive angles the closing element against the flow direction of the medium with reference to the valve seat of the globe valve, wherein in the feed area a flow guiding device is provided, and the flow guiding device is provided with an inlet area and an outlet area spaced thereto in flow direction of the medium for defined flow guiding of medium flowing in the inlet area, wherein the flow guiding device has at least one channel area that is delimited by at least a channel wall and a channel bottom sloping cone-like, cone-segment-like or down towards the valve seat, and sets the medium flowing through the at least one channel area at least partly in a helical twist.

The gist of the invention is the fact, that the medium flowing through the globe valve does no longer flow—as in the state of the art—through the globe valve or around the closing element with a high or exclusive motion rate in an axial direction (with reference to the valve seat), but has considerably higher motion rates running angled or diagonally thereto, and thus, with reference to the valve seat, achieves a preferably tangential or tangential-like inflow to the through opening (annular gap between closing element and valve seat). This measure already considerably improves the flow behavior of the medium flow through the invention valve.

The laminar flow through the entire valve, in particular through the globe valve dimensioned according to the invention, is maintained even at higher flow speed of the medium resulting in a considerable optimization of the flow behavior and thus leading to a noticeable increase of efficiency with flow resistances occurring otherwise being avoided.

A preferred embodiment of the suggestion provides that the flow guiding device diverts the medium such that the medium approaches the closing element substantially tangentially. In a preferred variant, not restricting the scope of the present invention, a closing ball is provided as closing the element. Designing the flow guiding device such that the medium approaches the closing element essentially tangentially results in the surface of the ball also being approached tangentially and not frontally, which would usually lead to respective turbulences and flow resistances. The valve seat of the globe valve is configured such that it perfectly interacts with the closing element in the closed position. By tangentially inflowing to the closing element this also results in a tangential inflow to the valve seat, thereby noticing a considerable reduction of flow resistance.

The arrangement of the invention proposal is chosen such that the flow guiding device diverts the medium such that the helical twist of the medium is formed, in particular in the area of the globe valve, preferably in the area of the valve seat. As explained earlier the globe valve is formed—by the valve seat and the closing element able to be angled with respect to the valve seat. The helical twist of the medium forms around an auxiliary axis, with said auxiliary axis preferably being positioned substantially rectangular on the valve plane incorporating the sealing edge of the globe valve. This auxiliary axis is alternatively described for example as a center axis, and incorporates, for example, the center point of the circle defining the circular valve seat. The term "helical" or "helical twist" describes the movements having an axial motion component (with reference to the symmetry or center axis) and a circular or helical motion component, with the orbit having a diameter remaining the same or changing, for example decreasing or increasing. Any of the aforesaid solutions is encompassed by the term "helical".

The axial motion rate of the medium at the level of the globe valve (with reference to the center axis) of the entire motion vector of the medium is, for example, less than 50%.

A preferred embodiment provides that the channel bottom plane at least partially incorporating the channel bottom forms an acute angle, preferably of 5 up to 85°, in particular of 15 up to 75°, in particular preferred of 20 up to 40°, e.g. 30°±2° or 30°±5° or 30°±10° with the valve plane incorporating the sealing edge of the globe valve. In conjunction with these features it is in particular pointed to FIGS. 1c, 1d and 1e of the enclosed drawings. As, according to the invention, the channel bottom is configured cone-like, cone segment-like or diagonally, the channel bottom plane is an auxiliary plane, incorporating at least a part, if necessary even an edge or a surface line of the channel bottom only, by means of which the geometric orientation of the channel bottom with respect to the globe valve is illustrated. Similarly, the term "valve plane" is described with respect to the interaction of the closing element of the valve seat of the globe valve and incorporates the sealing edge. Usually, the term "plane" is to be understood as a non-arched surface, without restricting the term "plane" thereto. The term "sealing edge" describes the edge of the sealing part of the globe valve that is the closing element seating on the valve seat. The sealing edge thus is the (in particular linear) transition from the sealing valve area to the valve area standing in the medium.

Figure 1A:
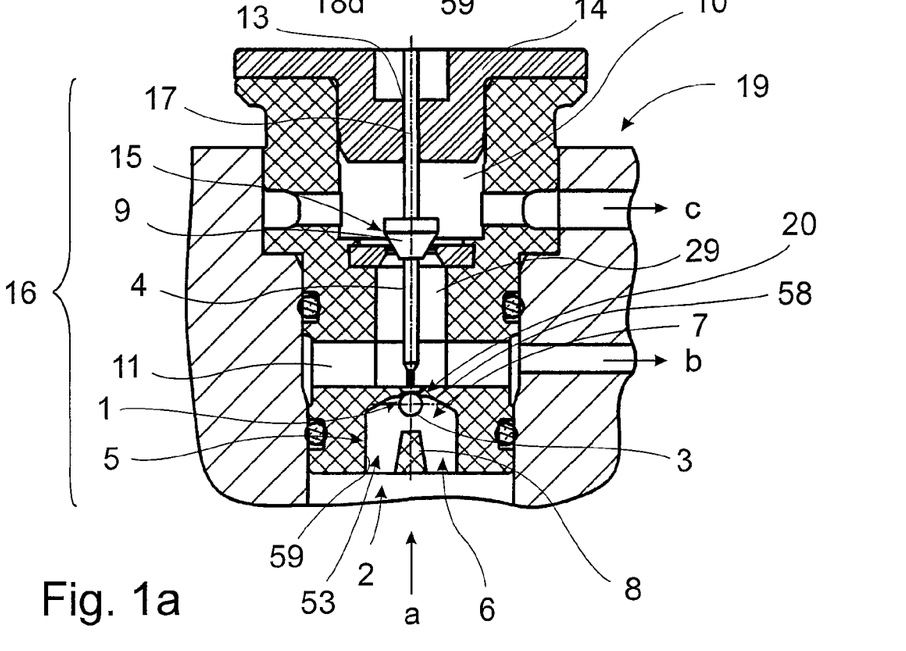
FIG. 1a is a section through a valve according to the invention.
Figure 1B:
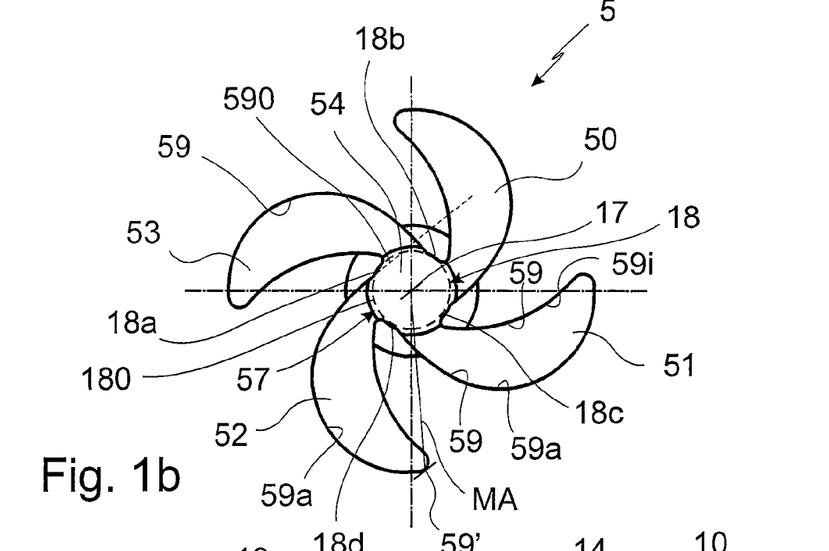
FIG. 1b is a top view of the flow guiding device according to the invention in schematic representation.
Figure 1C:
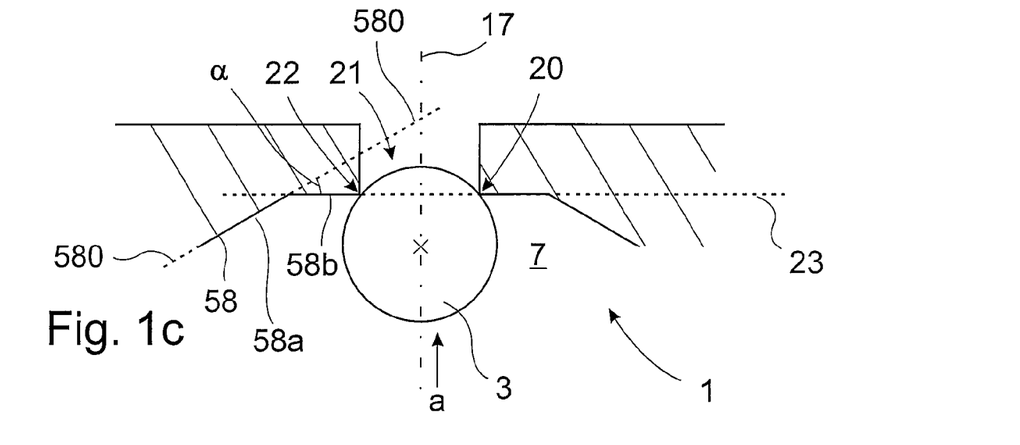
FIGS. 1c to 1e are each a section through different modifications of the configuration of a globe valve according to the invention.
Figure 1D:
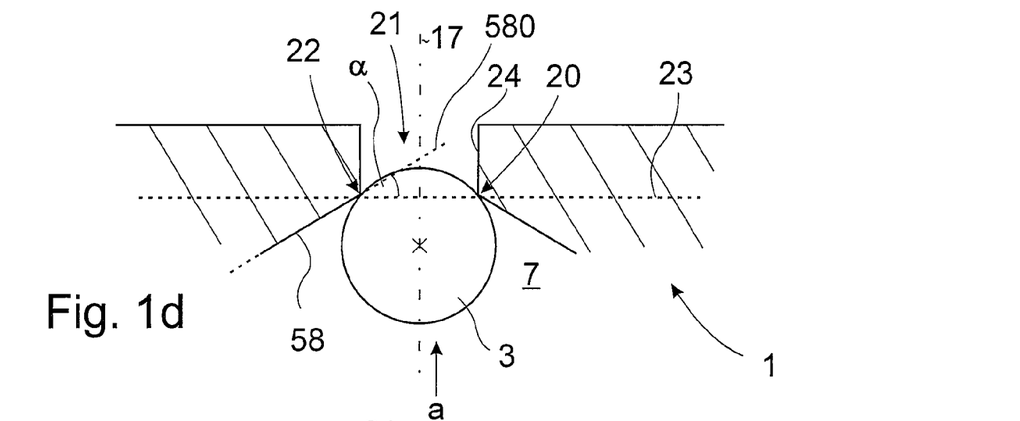
Figure 1E:
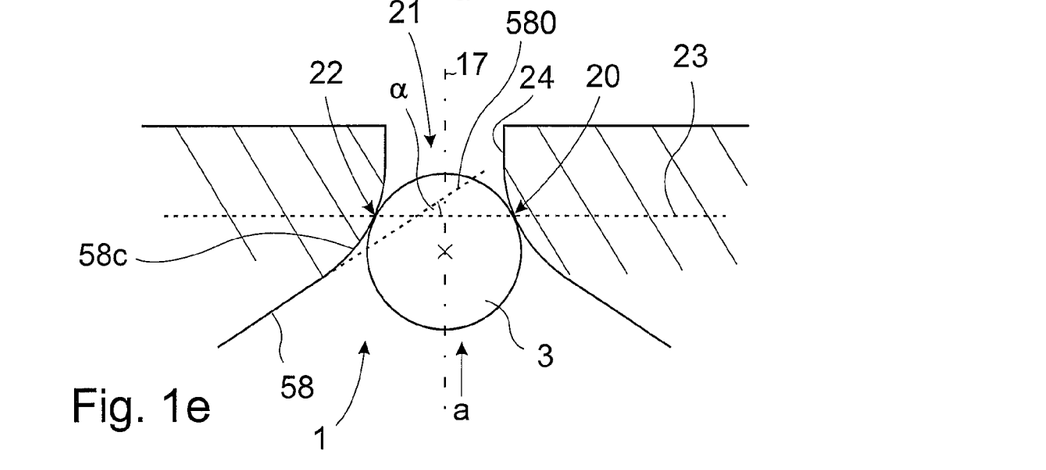
Figure 2A:
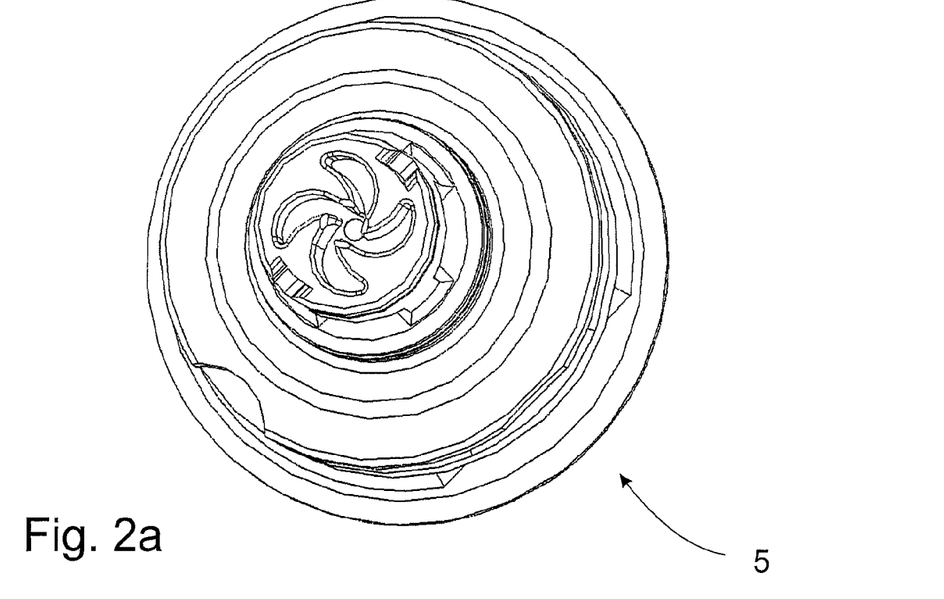
FIGS. 2a, 2b, 3a, 3b, 3c are each in a three-dimensional view with different viewing directions a flow guiding device as individual structural part according to the invention.
Figure 2B:
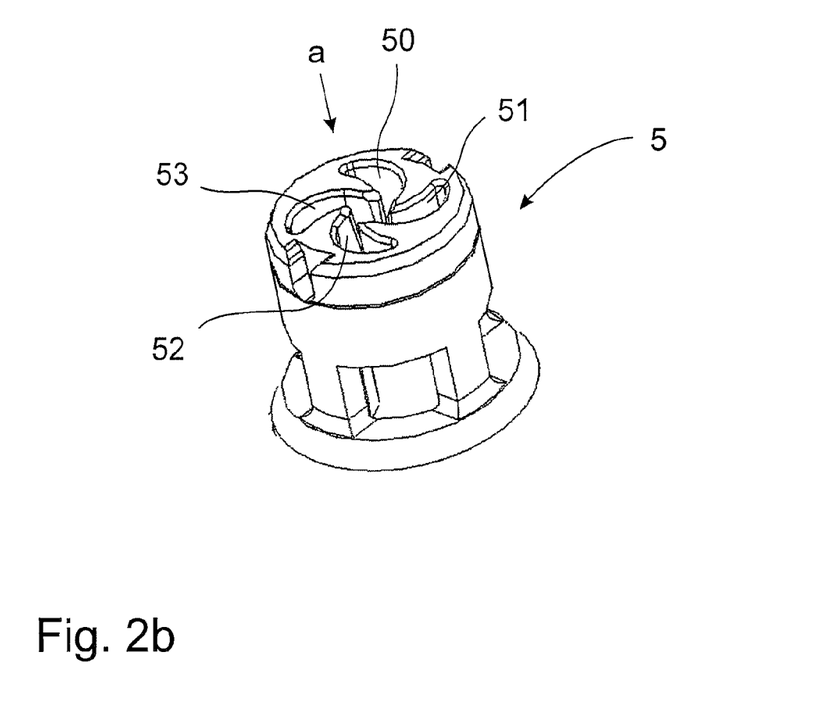

As shown in particular in FIGS. 1c, 1d and 1e, there are several variants of the channel bottom passing over into the valve plane incorporating the sealing edge or is connected to it. In this area, the configuration of the invention is very flexible and wide. The preferred embodiment of an acute angle between the valve plane and the channel bottom plane, in particular in a range of 30°±10° offers a perfect flow behavior with minimum resistances.

The invention is not restricted to configurations with the channel bottom being formed by one channel bottom plane, it is also possible, that the channel bottom is formed by two differently inclined partial surfaces of the channel bottom, or that the channel bottom surface is arched or concavely arched. These possible designs of the channel bottom are described as sloping down or funnel-like or funnel segment-like, or segment-like or cone-like or cone segment-like (these terms are interchangeable).

In case, the channel bottom is formed by at least two differently inclined partial faces of the channel bottom, the respective channel bottom planes incorporating the single channel bottom partial faces form different angles with the valve plane or with another reference plane of the valve.

In the channel bottom formed by several partial faces of the channel bottom the partial face located radially to the globe valve farther outwards covers a larger angle with the valve plane than the one farther inwards. This angle can be, for example, between 20 and 85°, preferably between 40 and 80°.

Preferably, the channel wall is configured such that it covers a substantially right angle or an angle between 75° and 90° with the valve plane. Here at least a part of the channel wall is the outside surface of a cylinder or prism with elliptic base, at least a part of the channel wall, however, may form the prism of a polygon.

Due to the configuration of the channel wall with in particular all channel walls of the different channel areas being orientated rectangular to the valve plane is, the total of the channel walls of the different channel areas are configured tube-like, and have constant cross section surface over the height of the channel wall. However, therefore the channel wall may as well be slightly inclined, for example ±5° or ±10°.

In another preferred embodiment of the invention, the channel area has an interior and an exterior, in particular at least partly curved channel wall, wherein the ratio of the respective curve radii of interior channel wall to exterior channel wall is in the range of 1.1 up to 2.5, preferably of 1.2 up to 1.6, in particular preferred of 1.2 up to 1.4 or more than 1.2 or 1.3, respectively. In order to divert the medium flow from its preferred axial flow direction to the cyclone-like or helical path of movement, at least one channel area is designed like a turbine bucket (see for example FIG. 1), with the channel area being limited by an interior and an exterior channel wall and the interior channel wall (seen in top view—see FIG. 1b) being shorter than the exterior channel wall. Resulting thereof the respective curve radii, by means of which the interior or exterior channel wall can on average be described, are different, however the ratio of these curve radii, describes the design of the channel area. It has to be emphasized, that the curve radii of the interior and exterior channel wall, respectively, each do not remain constant—i.e. unchangeable—, instead, with reference to the radial distance to the center axis, these curve radii may change. Advantageously, the aforementioned curve radii ratio—in particular in the interior area of the channel area facing the sealing edge—is preferably within the before mentioned preferred ratio intervals. The before described ratio exists at least in a range of at least 40%, 50%, 60%, 70% or 85% of the maximum distance (MA) of an area of the channel wall.

In particular the given ratio refers to areas of the interior and exterior channel wall having identical radial distance to the center axis of the globe valve. By a rather large ratio, for example more than 1.3 or 1.4 forming of the helical motion in the medium flow is facilitated.

An alternative embodiment of the suggestion provides that the at least one channel area extends radially outwards with reference to the globe valve. The globe valve may be defined by a center axis. For example, the center axis is parallel to the flow direction in the feed area, and is, for example, orthogonal to the plane incorporating this valve seat. Therefore, this center axis is defined radially outwards with respect to the valve seat.

Furthermore, it is provided in the preferred variant of the invention, that the flow guiding device has an at least semi-cage-like guiding arrangement for the closing element arranged loosely. Such design facilitates mounting of loose closing element, and further guarantees, that the closing element is not lost during operation.

Preferably the guiding arrangement is formed of the areas of the channel walls radially closest to the valve seat, wherein these areas are arranged commonly on a maximum inscribed circle. Thus this arrangement of the guiding arrangement defines the maximum inscribed circle, with a configuration as rotational symmetric as possible being preferred.

Preferably, several channel areas are provided in the flow guiding device. For example, 2, 3, 4, 5, 6 or even more channel areas are arranged equidistantly in the direction of circumference around the center axis. Favorably there is identical flow cross section for the medium of the single channel areas in order to maintain a laminar flow.

In a preferred embodiment of the invention a (fictitious) elongation of the channel wall ends tangentially in the valve seat or in the closing element, respectively. This defines a possibility for the inflowing medium to approach the valve seat or the closing element tangentially on a helical path. In particular, a multitude of channel areas is provided, preferably equidistantly, and each of these single channel areas is designed identically, such that, seen in the direction of the circumference, the individual medium flows out of the individual channel areas re-unite at the valve seat (in the central channel area) into a common flow, diverted on a helical path and thus passing the globe valve.

The advantageous embodiment, with the maximum channel width being smaller than the diameter of the closing element, ensures that the closing element is not lost in the flow guiding device. In particular, the closing element remains within the maximum inscribed circle.

Another preferred embodiment of the invention provides for a channel area having a channel gap in the direction of the valve seat, with the width of the channel gap being at most up to 50%, preferred up to 35%, in particular up to 25% of the diameter of the valve seat or the diameter of the closing element. This also achieves, that the loose closing element is not lost in the flow guiding device.

Furthermore, it is provided that the ratio of the maximum distance of an area of the channel wall to the center point of the globe valve (for example the center axis) to the inside dimension of the globe valve (the diameter of the valve seat or the screen) is at least 2, preferably at least 3, in particular at least 4, advantageously at least 5. The larger this ratio the more space exists for impinge the rotational motion elements in the medium flow.

Advantageously it is provided that the closing element is configured as closing ball.

Furthermore, it is provided that the ratio of the diameter of the closing element or the closing ball to the inside dimension of the globe valve is between 1.04 and 1.5, preferably between 1.1 and 1.4, in particular preferred between 1.15 and 1.3. It has been found in the given ratio intervals that the flow-through behavior has been improved considerably by the valve according to the invention.

Furthermore, it is provided in a preferred embodiment of the invention that the ratio of the shortest distance from interior to exterior channel wall to the maximum width of the channel in the channel area is at least 1.5, preferably at least 2, in particular more than 3. In particular, it is possible according to the invention that the shortest distance from interior to exterior channel wall forms at the channel gap or is in the area of the channel gap. A rather narrow configuration of the channel gap results in a very efficient (as exactly orientated) approach to the valve seat or the closing element in tangential direction, as described. The channel width is here preferably dimensioned such that it is slightly smaller than the diameter of the closing element so that it is not lost in the flow guiding device.

Preferably, the ratio of the diameter of the maximum inscribed circle to the inside dimension of the valve seat is in the range of 1.1 to 2, preferably of 1.15 to 1.5, in particular preferred from 1.2 to 1.4, or 1.3 to 1.4. These ratios have the aim, that the maximum inscribed circle is only slightly larger than the inside dimension of the valve seat. Therefore, the front end of the channel wall is guided rather closely to the valve seat, what supports considerably the desired configuration of a tangential approach to the valve seat or the closing element. At the same time, the rather narrow design achieves a perfect guiding of the closing element by the guiding arrangement defined by the maximum inscribed circle.

Preferably, as rod drive a solenoid is provided, the armature of the solenoid acting on the activation rod. The construction of a solenoid is sufficiently known. A coil former carrying windings of wire that can be flown through by current surrounds at least partly an armature space receiving an armature. Seen in axial direction of the coil former, the magnetic core or core is linked to the armature space, the core having a bore hole, if necessary with support and/or guiding elements, for guiding through an armature rod or the activation rod. When the wire is electrified, in the interior of the coil a magnetic field is formed acting on the magnetizable armature and moves it, in particular over an air gap. This movement of the armature is transmitted either directly or indirectly, for example by an armature rod, to the activation rod. Here either a rigid coupling or a floating arrangement is provided between the armature or the armature rod and the activation rod. When the arrangement is floating, there is no rigid connection between the armature or the armature rod and the activation rod.

In a preferred development of the invention, another (second) globe valve is provided in flow direction of the medium after the (first) globe valve that can be closed by the loose closing element. Advantageously, the activation rod provided for activating the closing element of the first globe valve serves also for triggering a closing element of this second globe valve. For example, the activation rod carries here a cone-like closing element interacting with the valve seat of the second globe valve.

Thus, for example, the first globe valve is arranged between the feed and the load exclusion, and the second globe valve between the load exclusion and a return.

It is an advantage here, that the medium flow already set in a helical path has this rotational movement still in the area before the second globe valve, and therefore this also presents a clear improvement.

This modification makes it possible to reshape the medium flow into a helical movement.

It is here an advantage of this modification, that the channel areas are dimensioned such that the closing element, configured for example as ball, cannot slide or glide in these channel areas. The solution according to the invention achieves also, that the closing element is in the interior of the flow guiding device, and this is in such a way that it cannot glide out of the guiding anymore. The suggestion according to the invention stops the swinging movement of the closing elements or the activation rod, so that this essential disadvantage of the solutions of the state of the art does not occur now anymore. A separate closing element seals the flow guiding device on the backside after introducing the closing element in the central channel area, so that it cannot glide out of the flow guiding device even against the flow direction of the medium, when, for example, the valve is pressure-less.

Thus, several advantages are achieved by means of the solution according to the invention, namely, on the one hand, that a laminar flow, and therefore with little flow resistance, is achieved, and, on the other hand, the function of the closing element is always guaranteed as it cannot get anymore in the channel areas or channels of the flow guiding device. Mounting of the valve according to the invention is also made considerably easier, as in particular introducing the closing element in the flow guiding device is made very easy.

The closing element of the flow guiding device can be provided here in a sort of filter basket surrounding the flow guiding device. Another aspect of the closing element is the fact that by means of the central closing device of the middle area in which the closing element moves an axial motion flow of the medium is impeded as it namely seals again this area. Thus, simultaneously a restricted guidance of the medium in the channel areas is reached, so that the desired helical movement of the medium is achieved.

Preferably, here the channel areas are bucket-like, similar to turbines, seen in top view. In the view a cone-like or helical configuration of the channels of the flow guiding device is the result.

The invention device also encompasses valves configured as pressure valves and proportional pressure valves without being restricted thereto.

BRIEF DESCRIPTION OF THE DIFFERENT VIEWS OF THE DRAWINGS

The invention description below refers to the accompanying drawings, of which.

DETAILED DESCRIPTION OF EMBODIMENTS

In the figures identical or corresponding elements each are referred to by the same reference numbers, and therefore are, if not useful, not described anew.

FIG. 1a shows a section through a valve 19 according to the invention, that is configured, for example, as pressure control valve. The valve 19 according to the invention consists here of a valve body 16, shown essentially in FIG. 1a, and a drive unit configured for example as solenoid that provides the rod drive for the axial (with reference to the center axis 17) movably activation rod 4. Here, the valve body 16 is slid on the yoke-like core piece 14 of the solenoid, the core 14 has a penetration opening 13 serving for receiving or guiding the activation rod 4. The solenoid not shown here is then linked above the core 14 in the usual way of construction. Preferably, the rod drive is designed as solenoid, the armature of the solenoid acting on the activation rod, wherein, for example, a floating support of the activation rod on the armature can be provided, or the activation rod is configured as armature rod that is connected fixedly with the armature of the solenoid. The armature moves here in an armature space, and is made of magnetizable material. The armature is positioned in the armature space because of the magnetic field generated by the current flow, and thus produces via the activation rod also the respective switching states of the valve. The basic construction of such a pressure control valve can be seen, for example, in the European Patent Application 1 004 066, to the full content of which it is referred here in connection with the details of a solenoid.

The valve has a feed area 2. The medium flows through it in flow direction a in the valve 19 according to the invention. In the valve body 16 in the feed area 2 a flow guiding device 5 is provided.

The flow guiding device 5 has an inlet area 6 and a subordinate outlet area 7 spaced thereto in the flow direction a of the medium. The flow guiding device 5 serves for providing a defined flow guiding for the medium flowing in the inlet area 6. For this, the flow guiding device, that will be explained further on, is equipped with at least one channel area 50, 51, 52, 53, the channel area being designed such that the medium flowing through is set at least partly in a helical twist.

The construction of the valve 19 according to the invention is such that in flow direction a after the feed area 2 a (first) globe valve 1 is disposed. The feed area 2 is thus defined partially by the globe valve 1.

In the embodiment shown here the globe valve 1 is also realized at the same time in the flow guiding device 5, however, without restricting the invention to it. With respect to the function, the feed area 2 is restricted by the globe valve 1, with respect to the construction, it is basically also possible to separate the globe valve 1 from the flow guiding device 5 with its special function (impressing a helical medium motion). This is not contradictory.

At the (first) globe valve 1 the passage is controlled in the direction to the load (indicated by arrow b).

On the back side (with reference to the flow direction a) behind the first globe valve 1 an outlet 11 is linked, serving, on the one hand, for guiding the medium in the direction of the load in the load direction b. Before the outlet 11 also a branch 29 branches off in the direction of the second globe valve (15).

In the flow direction of the medium behind the second globe valve 15 the return area 10 is linked, that means the branch 29 is separated from the return area 10 by the second globe valve 15, the return direction is indicated by arrow c.

Cleverly, the arrangement is here chosen such that the activation rod 4 controls the closing element 3 of the first globe valve 1 as well as the closing element of the second globe valve 15 configured as sealing cone 9.

The construction of a globe valve 1 is generally here such, that the globe valve 1 is formed by a valve seat 20, stationary in the valve body 16, on which a (movably arranged) sealing body 3 rests depending on the switch position. The sealing body 3 seals here a screen 21.

In the area of the flow guiding device 5 an inlet area 6 is provided. Furthermore, in flow direction a of the medium, spaced thereto, an outlet area 7 is provided in the flow guiding device 5.

Referring to the feed area 2, the medium is guided in the flow direction a via the inlet area 6 in the direction of the outlet area 7, and here—as it can be seen in FIG. 1b—by the bucket wheel arrangement of channel areas 50-53 set in a twist motion. This is carried out by guiding these channel areas 50-53 in the direction from the inlet area 6 to the outlet area 7, for example, each time in the way of a helical line. In the center of the flow guiding device 5, here another central channel area 54 is provided serving in particular for receiving a closing element 3, that can be seen in FIG. 1a, and surrounding it (half) cage-like or channel-like. The configuration is here such, that the closing element 3 cannot slide or get out of the channel area 54 in the channel areas 50-53, as the dimensions of these channel areas 50-53 are dimensioned such that the closing element 3 cannot slide in there. The diameter of the closing element 3, that is designed, for example, as ball, is accordingly larger than the connection of the respective channel areas 50-53 located to the inside, the channel gap 57.

The closing element 3 is operated by an activation rod 4. This is connected with a solenoid, not shown in the representation according to FIG. 1a or FIG. 1b. When electrified, the activation rod 4 is moved in the direction opposite the flow direction a of the medium—that is opposite the pressure—such that the valve 1 is opened. By means of this the medium can get out of the feed area 2 via the inlet area 6 and the outlet area 7 in the outlet 11. Arrow b indicates here the flow direction for the outlet 11 (in the direction of the not shown load). Above the outlet 11 a return area 10 is located. This is usually closed with a sealing cone 9. When the activation rod 4 is reset, here a certain distance of the cone to the cone seat is produced, so that medium, that is still there, can get in the return area 10. c indicates the flow direction of the medium in direction 10 (in direction of the not shown reservoir). The valve is provided here for example encapsulated—for example within a transmission—, so that the oil does not leak but remains completely in the transmission or in a housing.

FIG. 1b shows a view from flow direction a (that is from below, seen from FIG. 1a). Only the channel areas 50-54 are shown schematically. The channel areas 50-53 surround here bucket-like the central channel area 54, and are designed in particular in their longitudinal extension upwards or in the medium flow direction a for example helically. The success is here, that the desired direction of twist or flow of twist of the medium is obtained. In the center of the flow guiding device 5 another central channel area 54 is located, provided, on the one hand, also for guiding medium, on the other hand, however, for guiding the closing element 3 configured as ball, and this is such that it cannot glide out of the channel area 54. In particular also a closing element configured as closing plug or cone or the like, indicated by reference number 8 in FIG. 1*a*, serves for that. This is introduced or put on after introducing the closing element 3 in the channel area 54, so to speak as end element 8. Thus the closing element 3 cannot glide anymore out of the channel area 54. Because of the fact, that it cannot fall or glide in the channel areas 50-53 either, the closing element 3 remains always in this channel element 54—it is guided safely even in the pressure-less condition of the valve. The end element 8 also serves for preventing the medium from flowing through in axial direction of the valve. The helical movement of the medium forms here preferably within the channel area 54, in particular within the maximum inscribed circle 180, that means the diameter of the helical twist is less than the diameter of the maximum inscribed circle 180.

The closing element 8 of the flow guiding device 5 can be here a part of a separate closing basket not shown here, that is connected at the same time with a sieve or a filter device that prevents dirt in the medium, such as, for example, small steel or metal chips, from getting in the range of the valve seat 20. This prevents the valve from being damaged or prematurely worn by the soiling. The configuration of the closing element 8 has to be seen here in very different aspects. Thus, it may be provided, for example, as cone, pin or as ball-shaped closure, sealing the central channel area 54. The flow guiding device 5 can be connected, according to the invention, either in one piece with the already described filter or sieve basket. However, also a two-piece configuration is possible according to the invention. As already mentioned, the invention has the advantage that the twist creator or the flow guiding device 5 is in the first step of the valve, that is at the first globe valve 1.

It is an aim of the design according to the invention to impress a helical motion component in the medium flowing through. The medium flow approaching in axis direction (in direction of the center axis 17) in the inlet area 6 receives here an appropriate additional motion component, that is shown by a clever design of the channel areas 50, 51, 52, 53, such as, for example, in FIGS. 3*a*, 3*b*, and 3*c* (this is similar to FIG. 1*b*). Thus, it can be seen clearly, for example in particular in FIG. 3*a* (for example in the channel area 53), that the design, in top view bucket-like, combined with a channel bottom 58 resting, for example, on a cone outside surface with reference to the center axis 17 contributes to a helical course of the channel bottom 58, and thus the interaction of the channel walls 59 limiting the channel area 50, 51, 52, 53 laterally with the coiled channel bottom 58 effects a very effective diversion of the medium flow.

For example, as medium gear oil or other hydraulic liquids that can be used as medium are diverted in such a twist or rotation or helical movement, that considerable motion parts are orientated in rotary or tangential direction to the screen 21 of the (first) globe valve 1.

It has been found to be highly efficient for the channel areas 50, 51, 52, 53, if they are, seen in top view, are configured, for example, turbine-like. In the embodiment shown here, four channel areas 50-53 are provided each with the same size—configured equidistantly with reference to the center axis or the center point 17. They are characterized in that the (middle) radius of the interior channel wall 59*i* is clearly larger than the (middle) radius of the exterior channel wall 59*a*. The term "interior" and "exterior", respectively, is derived here from the moved system of the flowing medium that is guided and diverted by the exterior channel wall 59*a*. The exterior channel wall 59*a* of a channel area 50 to 53 is here clearly larger than the interior channel wall 59*i* of a channel wall. Reference number 590 in FIG. 1*b* shows the extension of an exterior channel wall 59*a* of the channel area 52. The arrangement is such, that this extension 590 runs tangentially to the sealing edge 22 or the valve seat 20, and therefore also to the circular or ball-like, loose closing element 3.

MA indicates the maximum distance between the center axis/center point 17 (defines, for example, also the center point of the circular valve seat 20) and the area 59' of the channel wall that is farthest away from it. In a preferred embodiment of the invention, the ratio of this maximum distance to the inside dimension of the globe valve 1 (for example of the screen diameter to the screen 21) has at least the dimension-free value 2, preferably at least 3, in particular at least 4, advantageously at least 5. The larger this ratio, the more effective and with less current it will be possible to divert the medium flow appropriately.

The central channel area 54 (see FIG. 1*b*) serves in particular for the (half) cage-like guiding of the loosely arranged closing element 3, and makes sure, that it is not lost in the valve 19. The cage is completed by the closing element 8 arranged at the inlet side 6 of the flow guiding device 5. This central channel area 54 is therefore limited by a guiding arrangement 18, that again is configured by the areas 18*a*, 18*b*, 18*c*, 18*d* of the channel walls 59 located radially next to the valve seat 20 or its center axis/center point 17. Preferably, these areas are positioned together on a maximum inscribed circle 180. This can be seen, for example, in FIG. 3*c* as well as in FIG. 1*b*.

Figures 3A, 3B, 3C:
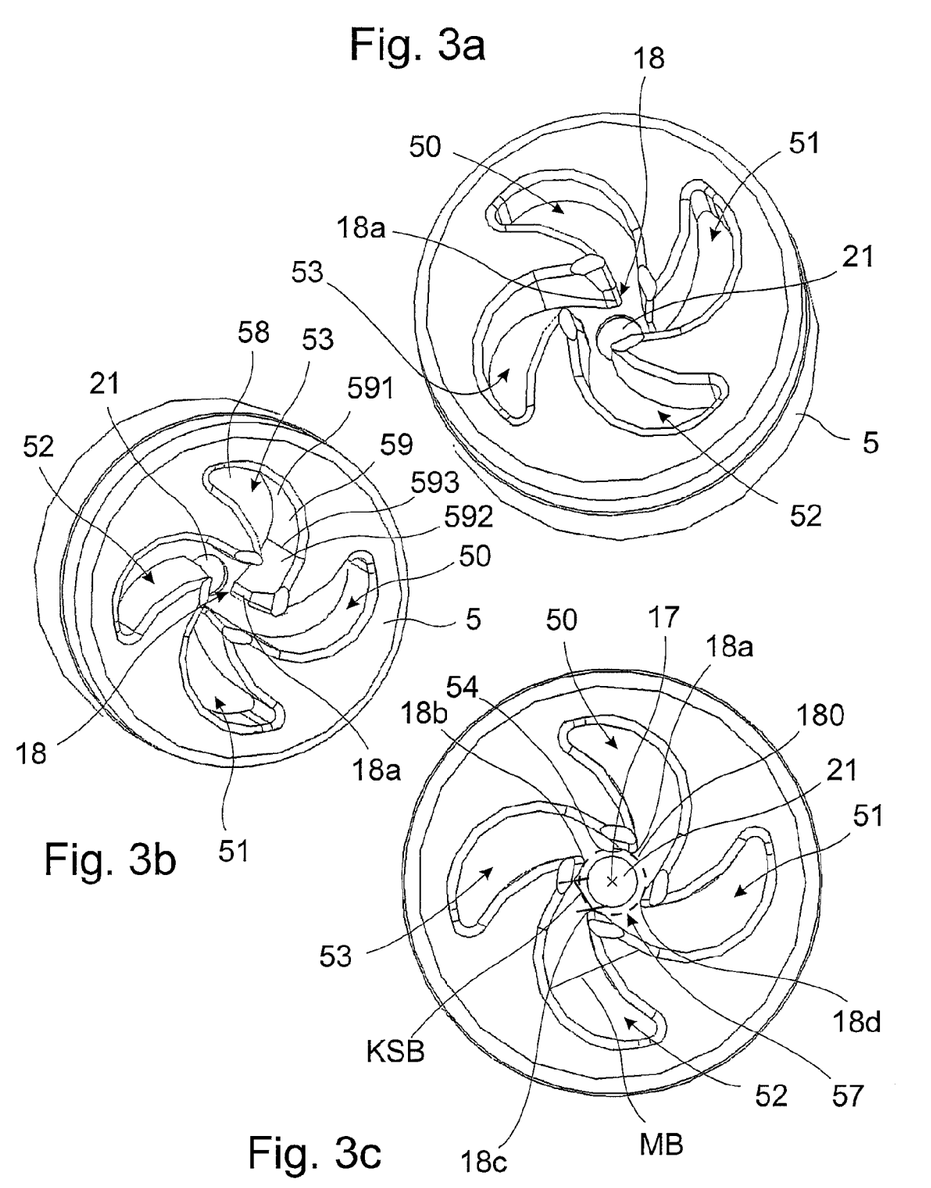
Figure 4:
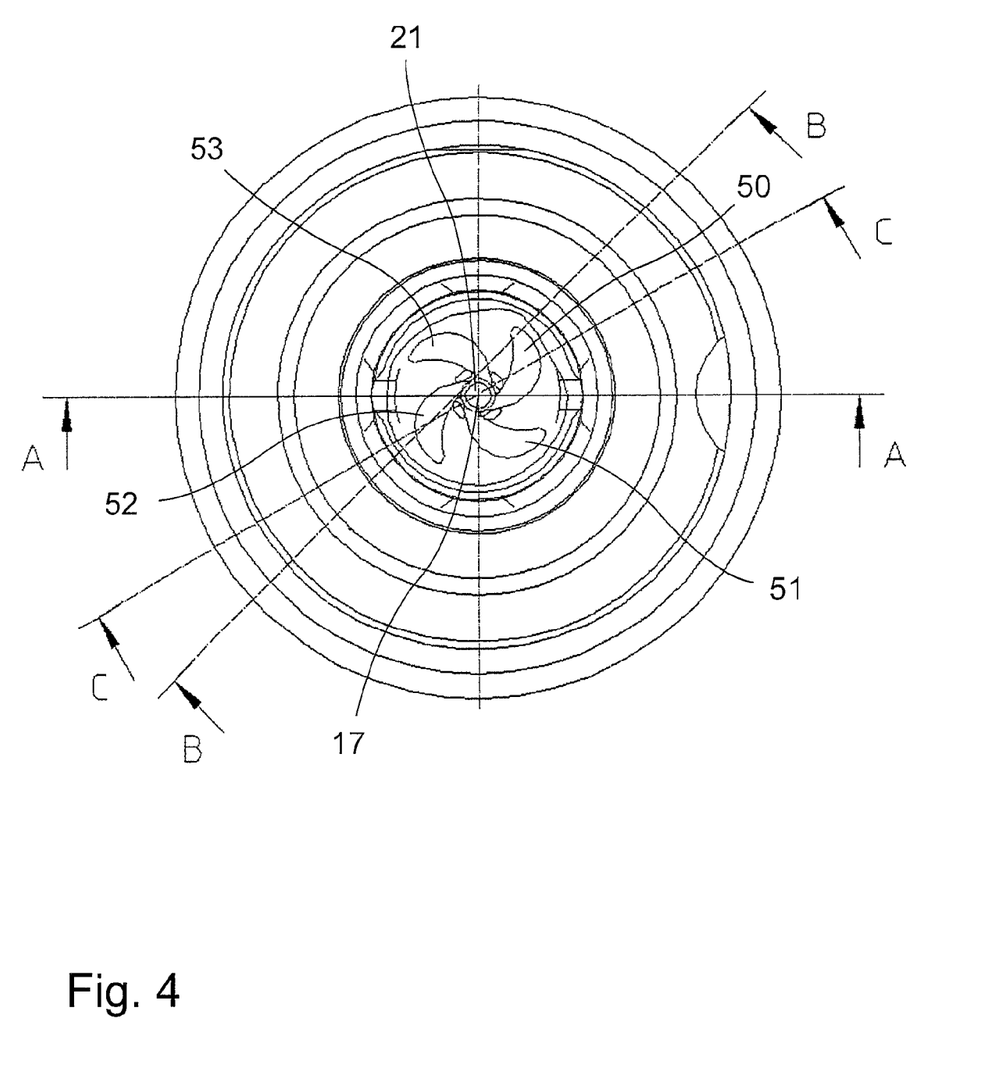
FIG. 4 is a bottom view of the valve according to the invention.

It can be seen clearly in FIG. 3*b* that the channel wall 59 also consists of several channel wall areas 591, 592 with different curve radii that meet at a connection edge 593. Thus, for example, the curve radius for the inflowing medium can be varied and adapted accordingly.

MB in FIG. 3*c* indicates the maximum channel width, that is the distance between the interior channel wall 59*i* to the exterior channel wall 59*a* of a channel area. First, this maximum channel width MB is smaller than the diameter of the loose closing element 3 in order to prevent the closing element 3 getting lost forever out of its position before the valve seat 20. However, it is also provided that the ratio of the shortest distance from interior (59*i*) to exterior (59*a*) channel wall to the maximum channel width MB in the channel area 50-53 has at least the value 1.5, preferably at least 2, in particular more than 3.

At the channel gap, the respective channel areas 50-53 lead to the central channel area 54. The width of the channel gap KSB, that may extend, for example, also between the areas 18*a*, 18*b*, 18*c*, 18*d* of the channel wall 59 with shortest distance to the center point 17, is 50% at the most, preferably up to 45% or 40%, in particular up to 35%, 30% or 25% of the diameter of the valve seat 20 or the diameter of the closing element 3.

Figure 5:
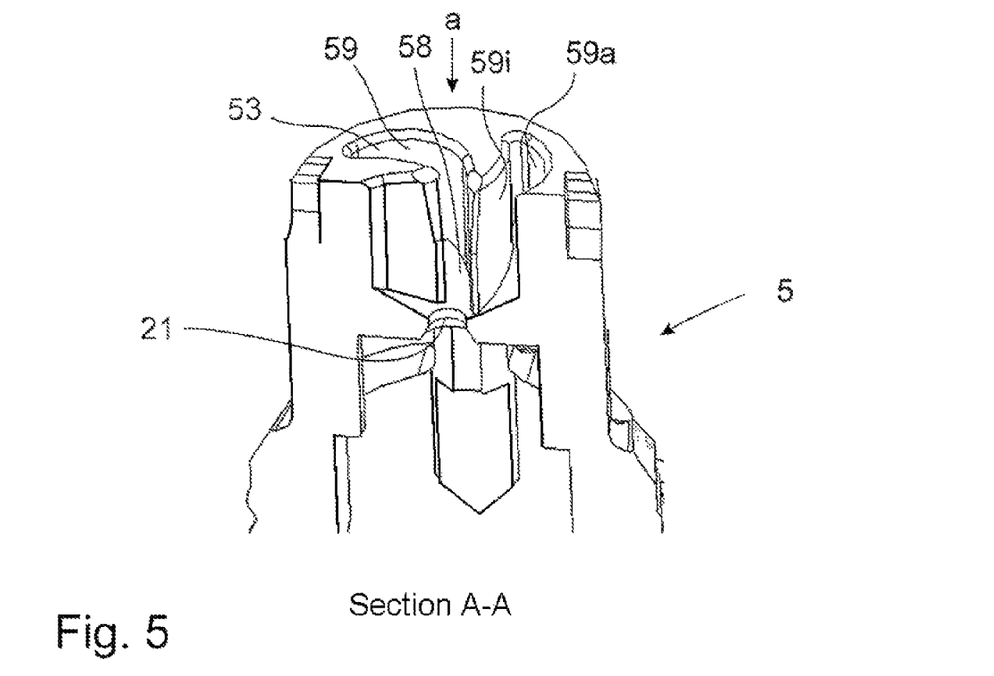
FIGS. 5, 6, 7 are each a section through a three-dimensional representation according to FIG. 4 according to the line A-A (FIG. 5), line B-B (FIG. 6) or line C-C (FIG. 7).
Figure 6:
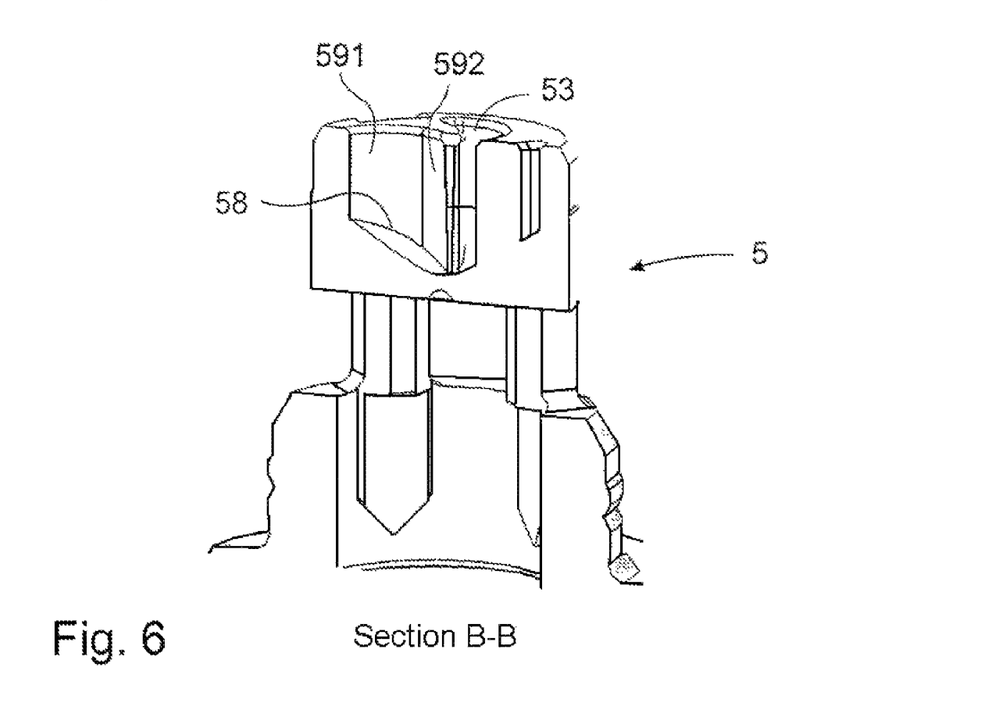
Figure 7:
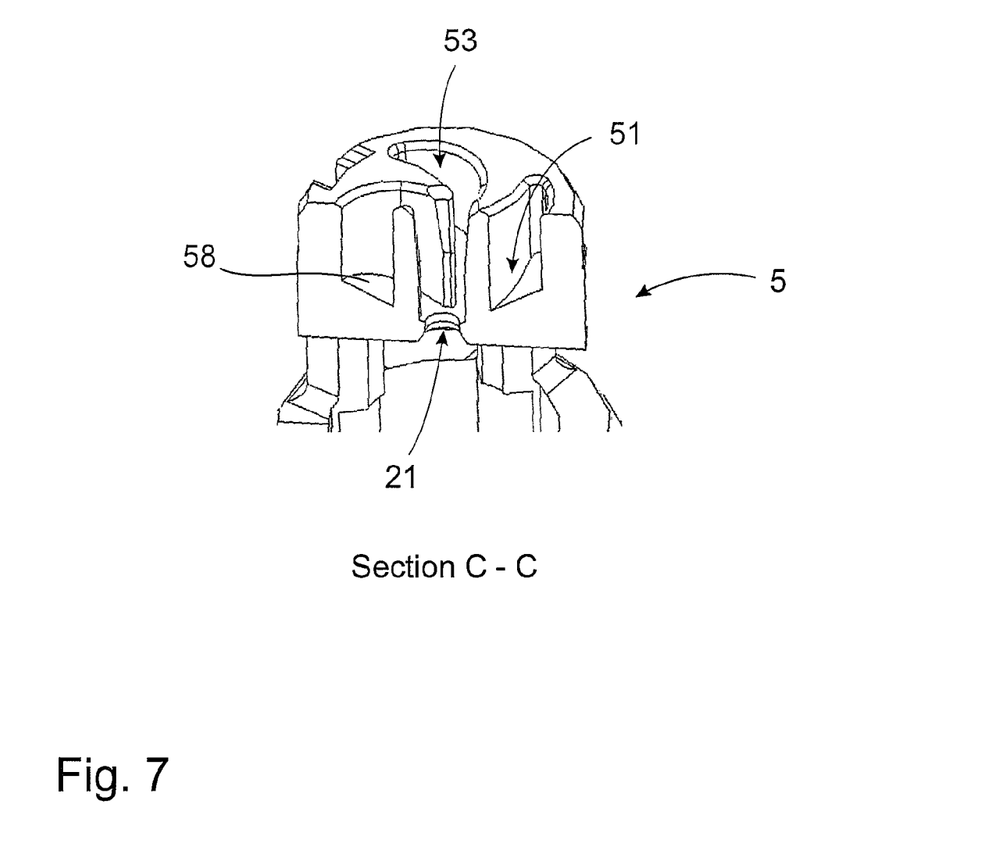

FIGS. 5, 6, 7 show different sections carried out in three-dimensional view through the flow guiding device 5 according to the invention. In particular, the coiled-curved course of the channel bottom 58 can be seen very clearly.

The arrangement shown in FIGS. 5, 6 and 7 is turned around 180°, compared with the arrangement shown in FIG. 1*a*. The medium would flow, according to FIGS. 5, 6 and 7, from the top in the inlet area 6 in the direction of the outlet area 7 with the screen 21—this is indicated by arrow a pointing downwards in FIG. 5.

FIGS. 1*c*, 1*d* and 1*e* each show in an enlarged sectional view, the particular modifications for the design of the first globe valve 1.

As already explained, it is equivalent, according to the invention, whether the globe valve 1 is configured separated from or integrated in (together with) the flow guiding device 5. For example, in particular, the valve seat 20 of the globe valve 1 can be designed as part of the flow guiding device 5 or independently from it.

The globe valve 1 consists, as a rule, of a valve seat 20 on which in the closed position of the globe valve 1 the loose closing element 3 rests, here for example a ball or closing cone. In the embodiment shown here, the loose closing element 3, that is not held by an activation rod 4 or fixed on the activation rod 4, is pushed on the valve seat 20 by the medium pressure (in flow direction a) prevailing in the feed area 2.

The different modifications shown in FIGS. 1c, 1d, 1e are not a concluding list of the different possible constructions of the globe valve 1 according to the invention. However, they serve for illustrating the essential relations in this area of the construction according to the invention. The valve may be configured e.g. as pressure or proportional pressure valve.

The closing ball, resting as loose closing element 3 on the valve seat, seals the screen 21, that releases the medium (the flow direction of the medium is indicated here by arrow a). The part of the activation rod 4 that angles the closing element 3 against the flow pressure or the flow direction a of the medium, while lifting and releasing, respectively, the closing ball or the closing element 3 from the valve seat 20, and thus opens the screen 21, is not shown.

At the side of the screen 21, the channel bottom 58 extends that may be designed in very different ways, as illustrated in FIGS. 1c, 1d, 1e.

A significant point of the invention is the fact, that the configuration of the channel areas 50 to 53, in particular of the channel bottom 58 or the channel walls 59 limiting the channel areas 50 to 53 are chosen so cleverly, that at least on the level of the closing element 3, in particular in the central channel area 54, an essentially laminar, however helical, medium flow results that influences, as described in the beginning, the switching behavior and also the vibration stability of such valves very positively.

The dashed line 23 defines in FIGS. 1c, 1d and 1e each time a valve plane 23. The valve plane 23 receives here the valve seat 20. The valve seat 20 is formed in particular when a ball-shaped closing element 3 interacts with a circular or annular sealing edge 22. This sealing edge 22 is an element of the valve plane 23.

In the example of FIG. 1c, laterally besides the screen 21 first a first channel bottom partial surface 58b is provided extending parallel to the valve plane 23, in this particular example even coincides with it. After this short parallel piece, a channel bottom part 58a angled to it is linked, this area being configured, for example, as cone or inclined surface. In the configuration shown here in FIGS. 1c, 1d and 1e this inclined channel bottom partial surface 58a or the channel bottom 58 (in FIG. 1d and FIG. 1e, respectively) is described simplified for illustrating the geometric relations by the channel bottom plane 580 that is at least partly a part of this channel bottom, or, for example, receives a cone-like configuration of the channel bottom 58 tangentially at a surface line of the cone. In the simplified two-dimensional representation, the cone-like configuration of the channel bottom 58 is an inclined plane. The chosen representation therefore makes the illustration of a (truncated) cone-like channel bottom 58 (that is an arched surface) as well as also of an inclined but itself plane, that is commutated, plane possible. Therefore, it is possible to describe the channel bottom or the inclined channel bottom areas 58, 58a with respect to the globe valve 1. According to a preferred embodiment of the invention it is provided here, that the channel bottom area 580 forms an acute angle α, preferably of 5° to 85°, in particular of 15° to 75°, in particular preferred of 20° to 40°, with the valve plane 23 receiving the sealing edge 22 of the globe valve 1. Good results have been achieved with respect to the vibration stability, for example, with an angle α of 30°±5°. However, it is also possible to arrange the angle α at 40°, 50°, 60° or 70°, each time with an appropriate interval of ±10°.

It is clear that the closing element 3 is located in the outlet area 7 of the flow guiding device 5.

In contrast to the modification according to FIG. 1c, FIG. 1d shows the modification with the (inclined or) cone-like channel bottom 58 leading directly funnel-like or partly funnel-like to the valve seat 20, that is, it is linked to the partition wall 24 of the screen 21. The sealing edge 22, that is ideally a line, is then defined just by this bend in which the partition wall 24 of the screen 21 goes over in the inclined or here also cone-like channel bottom 58. Ideally, also here the channel bottom 58 is defined by the channel bottom plane 580, and has to be understood in the embodiment shown here as cone-like auxiliary body.

The arrangement is chosen such in FIG. 1e, that the partition wall 24 of the screen 21 goes over in a rounding 58c in the inclined or cone-like extending channel bottom 58. Instead of the edge or the bend according to FIG. 1d, here a steady transition is shown. Altogether, the arrangement is, for example, funnel-like, again an exactly defined sealing edge 22 is formed defining the valve seat 20 and thus also the valve plane 23.

Although the invention has been described in terms of specific embodiments which are set forth in considerable detail, it should be understood that this is by way of illustration only, and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A valve comprising:
a feed area provided in line with a flow direction of a medium, the feed area being arranged in front of a globe valve, wherein the globe valve can be closed by a closing element movably arranged with respect to a valve seat of the globe valve and provided in the feed area, wherein an activating rod movable by a rod drive angles the closing element against the flow direction of the medium with reference to the valve seat of the globe valve, wherein in the feed area arranged downstream of the globe valve a flow guiding device is provided, and the flow guiding device having an inlet area and an outlet area, wherein the flow guiding device guides the medium flowing in the flow direction into the inlet area and to the outlet area ending at the valve seat of the globe valve, wherein the flow guiding device has a truncated cone-shape wall area delimited by a plurality of partial helical twist channels sloping from the bottom of the truncated cone for imparting a controlled helical twist to be the medium.

2. The valve according to claim 1, wherein the flow guiding device diverts the medium such that the medium approaches the closing element approximately tangentially.

3. The valve according to claim 1, wherein the flow guiding device diverts the medium such that the helical twist of the medium occurs in the area of the globe valve.

4. The valve according to claim 1, including a plane of the channel bottom, receiving the channel bottom at least partly, a valve plane receiving the sealing edge of the globe valve and a channel bottom of at least two differently tilted partial surfaces of the channel bottom, wherein the plane of the channel bottom receiving the channel bottom at least partly covers an acute angle α and wherein the acute angle α, is at least one of (a) 5° to 85°, (b) 15° to 75°, and (c) 20° to 40°, with the valve plane receiving the sealing edge of the globe valve.

5. The valve as set forth in claim 1, wherein at least part of a surface of the channel is at least one of (a) arched, and (b) concavely arched.

6. The valve according to claim 1, including a plane of the channel bottom receiving the channel bottom at least partly, a valve plane receiving the sealing edge of the globe valve, and a channel bottom of at least two differently tilted partial surfaces of the channel bottom, wherein the channel wall intersects with the valve plane at least one of (a) an approximately right angle and (b) an angle between 75° and 90°.

7. The valve according to claim 1 wherein the channel wall is, at least one of, (a) shaped along at least a part of the channel wall with an outside surface of a cylinder or a prism with elliptic base, and (b) shaped to include areas having different bending radii.

8. The valve according to claim 1, wherein the at least one channel area has an, at least partly, curved interior channel wall and exterior channel wall each with a respective bending radius, and wherein a ratio of the respective bending radii of the interior channel wall to exterior channel wall is at least one of approximately (a) 1.1 to 2.5, (b) 1.2 to 1.6, (c) 1.2 to 1.4, and (d) greater than 1.2 or 1.3.

9. The valve according to claim 1, wherein the at least one channel area extends radially outward with reference to the globe valve, with discrete portions of channel areas each having similar flow cross sections.

10. The valve according to claim 1, wherein the flow guiding device has a semi cage-like guiding arrangement for the closing element, and wherein the guiding arrangement is formed by the areas of the channel walls located radially next to the valve seat, and wherein the areas of the channel walls are located commonly on a maximum inscribed circle.

11. The valve according to claim 1, wherein the flow guiding device has two, three, four, five, or six channel areas arranged equidistantly.

12. The valve according to claim 1, wherein an elongation of channel wall ends of the channel wall extend tangentially into the valve seat or the closing element.

13. The valve according to claim 1, wherein a maximum channel width of the channel area is provided, and wherein the maximum channel width of the channel area is less than a diameter of the closing element.

14. The valve according to claim 1, wherein the channel area has a channel gap with a channel gap width in a direction of the valve seat, and wherein the channel gap width is a maximum of between 25% and 50% of a diameter of the valve seat.

15. The valve according to claim 1, wherein the channel area has a channel gap with a channel gap width in a direction of the valve seat, and wherein the channel gap width is a maximum of between 25% and 50% of a diameter of the closing element.

16. The valve according to claim 1, wherein a ratio of (a) a maximum distance between an inner area of the channel wall and a center of the globe valve to (b) an inner diameter of the globe valve is between at least 2 and 5.

17. The valve according to claim 1, wherein a ratio of (a) a shortest distance between an interior channel wall and an exterior channel wall to (b) a maximum 1 channel width in the channel area is between at least 1.5 and more than 3.

18. The valve according to claim 1, wherein a ratio of (a) a diameter of a maximum inscribed circle to (b) an inside dimension of the valve seat is in the range of at least one of (i) 1.1 to 2, (ii) 1.15 to 1.5, (iii) 1.2 to 1.4, and (iv) 1.3 to 1.4.

19. The valve according to claim 1, wherein the closing element comprises a closing ball.

20. The valve according to claim 1, wherein a ratio of a diameter of the closing element to an inside dimension of the valve seat is between at least one of (a) 1.04 and 1.5, (b) 1.1 and 1.4, and (c) 1.15 and 1.30.

* * * * *